United States Patent Office 3,398,280
Patented Aug. 20, 1968

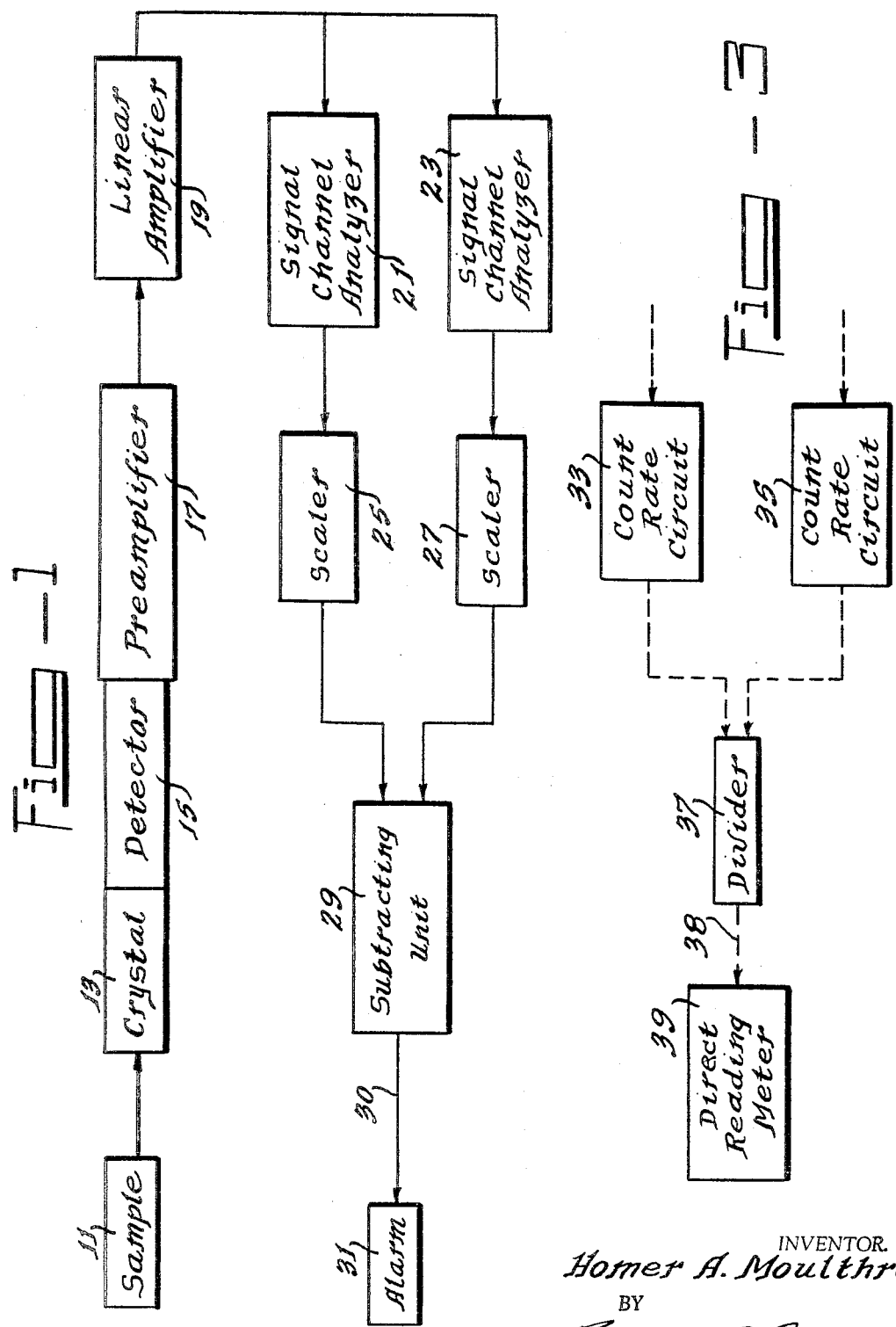

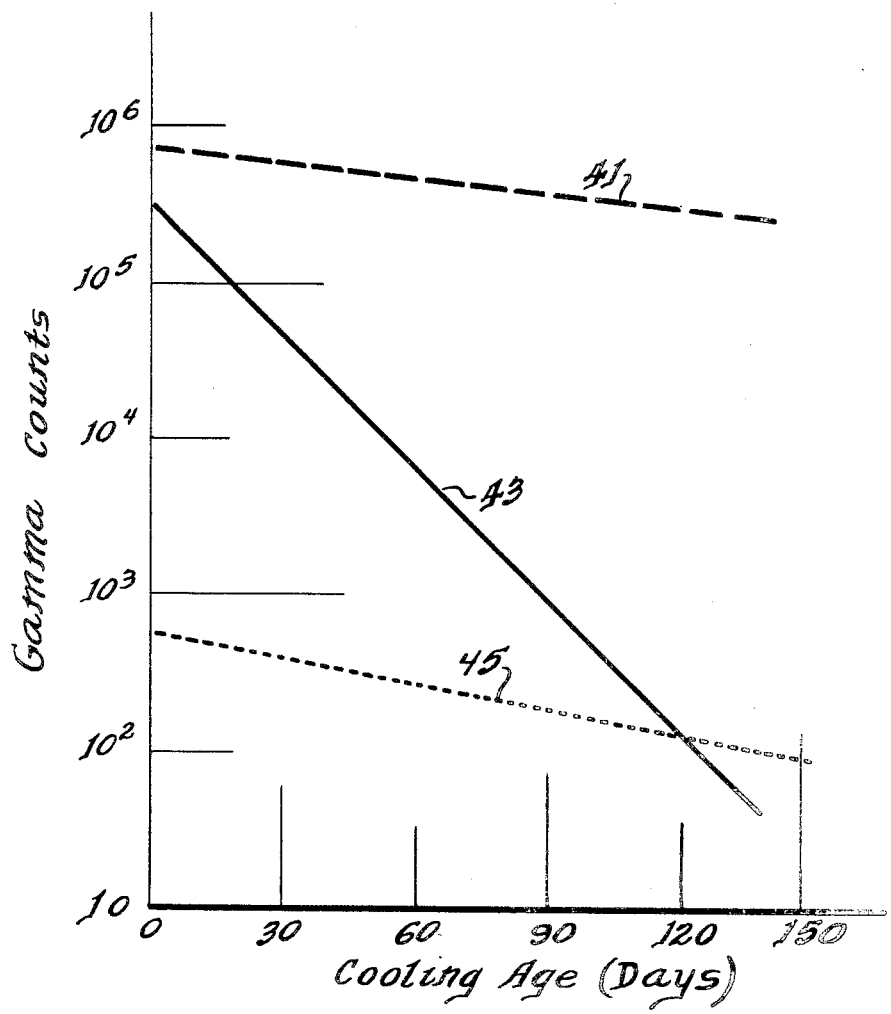

3,398,280
METHOD AND APPARATUS FOR DETERMINING COOLING AGE OF NUCLEAR REACTOR FUEL
Homer A. Moulthrop, Richland, Wash., assignor to the United States of America as represented by the United States Atomic Energy Commission
Filed Dec. 14, 1965, Ser. No. 513,861
12 Claims. (Cl. 250—83.3)

The invention described herein was made in the course of, or under, a contract with the United States Atomic Energy Commission.

This invention relates to a method and apparatus for determining the period of time which has elapsed since the termination of irradiation of nuclear reactor fuel in a nuclear reactor. More specifically, it relates to a method and apparatus to be used for determining the length of time for which nuclear fuel has been "cooled" or aged since its removal from a nuclear reactor.

Nuclear reactor fuel must be reprocessed periodically in order to remove isotopes and fission products which are both detrimental to further reactor operation and useful in other industries. In order to accomplish this reprocessing, it is necessary that the fuel be properly "cooled" or aged after irradiation so that product purity will not be affected by unwanted isotopes or elements and so that the reprocessing is carried out at a reasonably low level of radioactivity of the irradiated fuel.

At present the accidental processing of insufficiently aged fuel and the accidental inclusion of insufficiently aged fuel with properly aged fuel is prevented by the use of administrative procedures which involve keeping detailed records of the past history of identified batches of fuel. Such procedures are especially vulnerable to human error.

A further reason for obtaining accurate determinations of the aging time of irradiated fuel is for international inspection purposes. While it is possible for an inspection team to be present when a reactor is opened up for replacement of fuel, it would be a considerable waste of manpower and money to require their presence during the time which is required to properly age the fuel in order to insure that no changes or substitutions are being made.

By the use of an apparatus with which to determine cooling time, it would be a much easier task for an inspection team to determine in fact that the irradiated fuel elements in the cooling pit were the same fuel elements which were removed from the reactor $x$ number of days before.

Chemical methods for the determination of the aging period are both time-consuming and expensive. A suitable test method should be nondestructive to avoid unnecessary risks in the spread of radioactive materials and to avoid problems of waste disposal. Such a test method should be rapid and adaptable to remote operations. The ideal method also would be automated to minimize labor requirements as well as to limit the exposure of personnel to radioactivity.

It is therefore an object of this invention to provide a method and apparatus for the determination of the period of time which irradiated fuels have been allowed to age since their removal from a nuclear reactor.

It is a further object of this invention to provide an apparatus for the determination of the period of time for which irradiated fuels have been allowed to age since their removal from a nuclear reactor.

Another object of this invention is to provide nondestructive apparatus for determining the cooling time of irradiated nuclear fuel.

Another object of this invention is to provide an apparatus for determining the cooling time of irradiated nuclear fuel which may be operated remotely.

Another object of this invention is to provide a means for determining the cooling time of irradiated nuclear fuel which is easy to use and is relatively accurate as to the actual cooling time.

Still another object is to provide a means for alarming operator personnel should any improperly-aged, irradiated nuclear fuel be inadvertently included with properly-aged fuel for reprocessing.

The neutron irradiation of fissionable reactor fuel material such as $U^{235}$ produces a number of isotopes and fission products which emit various forms of energy as they experience radioactive decay. This radioactive decay, called beta decay, occurs in steps as the fission product decays from one element to another. For example, lanthanum 140, which has a half-life of 40.2 hours, decays by emitting first a beta particle which is followed by a gamma emission at an energy level of 1.6 mev. to become cerium 140. However, the decay curve of lanthanum 140 follows the 12.8 day decay curve of barium 140, since the lanthanum can decay no faster than it is formed from the barium 140 decay. I have devised an apparatus which will automatically relate the difference in gamma count rates for two different radioactive fission products to the elapsed time since discontinuation of irradiation. I have discovered that the rate of gamma photon emission from the beta decay of a relatively long half-life radioactive fission product, such as cerium 144 or zirconium 95, may be compared to the rate of gamma photon emission from the beta decay of a relatively short half-life radioactive fission product, such as lanthanum 140, to give a highly dependable indication of "cooling age."

FIGURE 1 is a block diagram showing one embodiment of this invention.

FIGURE 2 is a graph comparing the amount of gamma radiation from several isotopes with respect to time.

FIGURE 3 is a block diagram showing a modification of the apparatus of FIGURE 1 which incorporates alternate means for automatic readout.

Referring now to FIGURE 1, gamma rays emitted by a fuel material sample 11 cause scintillations in a crystal 13 which may be a conventional NaI(Tl) crystal. The scintillations, which are proportional in intensity to the energy of the gamma rays causing the scintillations, are detected by a conventional detector 15 which converts the light energy of a scintillation into a corresponding electrical impulse. This impulse is amplified by a preamplifier 17, giving an output signal which is fed into a linear pulse amplifier 19. The output signal from the amplifier 19 is fed into both a first single-channel analyzer 21 and a second single-channel analyzer 23.

The first analyzer 21 is adjusted to detect the signal peaks resulting from a gamma emission of a particular isotope decaying with a known relatively long half-life, examples of which are zirconium-niobium 95, which has a gamma radiation energy of 0.72-0.75 mev. and a half-life of 65 days, and cerium-praseodymium 144, which has a gamma radiation energy of 2.2 mev. and a half-life of 285 days. The impulse for each such gamma ray detected is fed into a first scaler 25 which records the total number of such impulses.

The second analyzer 23 is adjusted to detect the signal peaks resulting from a gamma emission of a particular isotope decaying with a known relatively short half-life, an example of which would be the previously mentioned lanthanum 140 decay. The impulse resulting from this emission is in turn counted on the second scaler 27. The first scaler 25 is set so that it will stop itself at a preset count and also stop the second scaler 27 simultaneously.

The readings of the first scaler 25 and second scaler 27 are fed either as corresponding electrical or mechanical signals to a conventional electrical or mechanical subtracting unit 29 wherein the count of the second scaler 27 is subtracted from the count of the first scaler 25. This difference in counts between the two scalers is then directly proportional to the cooling age of the fuel. The output signal 30 from the subtractor 29 is then fed into an alarm device 31 so adjusted that when the output signal is less than a predetermined amount, an alarm would sound to warn of the presence of fuel which was insufficiently aged for reprocessing.

The theory involved may be understood by considering FIGURE 2. It must be remembered that the invention is not limited to the isotopes used in this example, but that they are used merely to illustrate. In FIGURE 2, dashed line 41 represents the relationship of gamma counts to cooling age of 0.72 to 0.75 mev. gamma radiations from the zirconium-niobium 95 decay. Zirconium 95 is an isotope with a relatively long half-life as shown by the relative flatness of line 41. A solid line 43 shows the relationship of gamma counts to cooling age of 1.60 mev. gamma radiations from the barium-lanthanum 140 decay. Lanthanum 140 is an isotope with a relatively short half-life as shown by the steepness of line 43. By adjusting the second single-channel analyzer 23 to be sensitive only to the 1.6 mev. energy level of lanthanum 140 and the first single-channel analyzer 21 to be sensitive only to, for example, the 0.72 mev. energy level of the zirconium-niobium 95 decay, the difference in total gamma counts between the two isotopes will constantly increase as the time since irradiation is increased, and this difference will be linearly proportional to cooling age. Assuming that 120 days provides for sufficient cooling time for the fuel to age before reprocessing, the alarm system is set so that it would be triggered if the difference in counts does not equal or exceed the value indicated for 120 days cooling age. This same difference could be determined by one skilled in the art for any set of long-life and short-life isotopes and for any number of days deemed to provide sufficient cooling, depending upon the type of fuel being monitored.

Dotted line 45 is a transformed version of dashed line 41 obtained by presetting the first scaler to record only one count in a predetermined number of counts so that, when the subtraction function is performed, the difference must be equal to at least zero at 120 days cooling age. Any negative value would then activate the alarm system.

If desired, the subtracting unit 29 may be dispensed with and the aging time of the fuel determined graphically from the ratio of the counts. In such case, it is most convenient for the preset long-life isotope count of the first scaler 25 to be set as a power of 10, i.e. $10^3$, $10^4$, etc. Then the ratio of counts from the short-life isotope to counts from the long-life isotope is indicated directly by the count on the second scaler 27. This latter count then is inversely proportional to the cooling age of the fuel and may be converted to cooling age by reference to a suitable table or graph.

If desired, the first and second scalers, 25 and 27, could be replaced by first and second count rate circuits as shown by 33 and 35 in FIGURE 3. In this method, the continuous signals from the first count rate circuit 33 and from the second count rate circuit 35 are fed into a suitable divider 37. The signal 38 from the divider 37, representing the ratio of count rates, is proportional to the cooling age. This signal is directed into a suitably calibrated meter 39 where the cooling age is read directly from the meter.

A determination of accuracy was made by periodically monitoring the gamma radiation of a particular irradiated fuel slug which had been centrally located in a reactor. The ratio of counts was obtained by dividing a four-minute count of the 0.76 mev. gamma rays of the zirconium-niobium 95 transition by a four-minute count of the 1.60 mev. gamma rays of lanthanum 140 decay. The results gave a ratio of 0.56 at 33 days cooling, 2.8 at 70 days, 7.0 at 93 days and 20.15 at 124 days, which show a linear relationship when plotted on semi-log paper.

A considerable amount of similar data showed the ratios were only slightly affected by irradiation power level and total exposure and that at a fuel age of approximately 120 days the nominal value of the ratios indicate a fuel age within ±6 days with 95% confidence.

It is to be understood that the invention is not to be limited to the details given herein, but that it may be modified within the scope of the appended claims.

The embodiments of the invention in which an exclusive property or privilege is claimed are defined as follows:

1. An apparatus for determining the cooling age of irradiated nuclear reactor fuel, comprising: means for detecting gamma rays emitted by the irradiated nuclear fuel and for producing pulses corresponding in amplitude to the energy of such rays; a first single-channel analyzer connected to said detecting means, said first analyzer being set to respond only to pulses of an amplitude corresponding to the gamma energy of an isotope decaying with a known relatively long half-life; a second single-channel analyzer connected to said detecting means, said second analyzer being set to respond only to pulses of an amplitude corresponding to the gamma energy of an isotope decaying with a known relatively short half-life; means for converting the output of the first analyzer into a corresponding first signal representative of the repetition rate of pulses in said output; means for converting the output of the second analyzer into a corresponding second signal representative of the repetition rate of pulses in said output; and means for providing a physical measure of the relationship between the magnitude of said repetition rates.

2. The apparatus of claim 1 in which the first single-channel analyzer is set to respond only to pulses of an energy level of 0.72 to 0.75 mev. and the second single-channel analyzer is set to respond only to pulses of an energy level of 1.60 mev.

3. The apparatus of claim 1 in which the first single-channel analyzer is set to respond only to pulses of an energy level of 2.2 mev. and the second single-channel analyzer is set to respond only to pulses of an energy level of 1.60 mev.

4. An apparatus for determining the cooling age of irradiated nuclear reactor fuel, comprising: means for detecting gamma rays emitted by the irradiated nuclear fuel and for producing pulses corresponding in amplitude to the energy of such rays; a first single-channel analyzer connected to said detecting means, said first analyzer being set to respond only to pulses of an amplitude corresponding to the gamma energy of an isotope decaying with a known relatively long half-life; a second single-channel analyzer connected to said detecting means, said second analyzer being set to respond only to pulses of an amplitude corresponding to the gamma energy of an isotope decaying with a known relatively short half-life; a first-scaler connected to the output of said first analyzer for counting the pulses in said output; a second scaler connected to the output of said second analyzer for counting the pulses in said output, said first scaler including means for terminating the counting action of both first and second scalers when a preset count is reached in said first scaler; whereby said second scaler provides a signal which is linearly related to the cooling age of the irradiated nuclear reactor fuel.

5. The apparatus of claim 4 where the actual value of said preset count is a power of ten.

6. The apparatus of claim 4 where a subtractor is connected to the outputs of said first scaler and said second scaler for subtracting the output signal of said second scaler from the output of said first scaler; whereby the output of said subtractor is directly proportional to the cooling age of the nuclear fuel.

7. The apparatus of claim 6 further including an alarm connected to the output of said subtractor, said alarm activated by an output less than a value corresponding to the minimum desired cooling age.

8. An apparatus for determining the cooling age of irradiated nuclear reactor fuel, comprising: means for detecting gamma rays emitted by the irradiated nuclear fuel and for producing pulses corresponding in amplitude to the energy of such rays; a first single-channel analyzer connected to said detecting means, said first analyzer being set to respond only to pulses of an amplitude corresponding to the gamma energy of an isotope decaying with a known relatively long half-life; a second single-channel analyzer connected to said detecting means, said second analyzer being set to respond only to pulses of an amplitude corresponding to the gamma energy of an isotope decaying with a known relatively short half-life; a first count rate circuit connected to the output of said first analyzer for counting the repetition rate of the pulses in said ouput; a second count rate circuit connected to the output of said second analyzer for counting the repetition rate of the pulses in said output; a divider connected to the outputs of said first count rate circuit and said second count rate circuit for dividing the output signal of said first count rate circuit by the output signal of said second count rate circuit; the output of said divider then being directly proportional to the cooling age of the nuclear fuel.

9. The apparatus of claim 8 further including a suitably calibrated readout meter connected to the output of said divider, said readout meter displaying the cooling age of the fuel.

10. A method for determining the cooling age of irradiated nuclear reactor fuel, comprising: detecting the gamma rays of an isotope present in said fuel, said isotope having a known relatively long half-life; detecting the gamma rays of another isotope present in said fuel, said isotope having a known relatively short half-life; counting the gamma rays of said isotope with known long half-life for a constant period of time; counting the gamma radiation of said isotope with a known short half-life for the same constant period of time; and providing a physical measure of the difference in said counts, said difference being linearly proportional to the cooling age.

11. The method of claim 10 wherein the isotope with the known long half-life is zirconium 95 and the isotope with the known short half-life is lanthanum 140.

12. The method of claim 10 wherein the isotope with the known long half-life is cerium 144 and the isotope with the known short half-life is lanthanum 140.

References Cited

UNITED STATES PATENTS

| | | | |
|---|---|---|---|
| 3,086,116 | 4/1963 | Powers | 250—83 |
| 3,105,149 | 9/1963 | Guitton et al. | 250—71.5 |
| 3,114,835 | 12/1963 | Packard | 250—71.5 |
| 3,222,521 | 12/1965 | Einfeld | 250—83.1 |
| 3,321,626 | 5/1967 | Allenden et al. | 250—83.3 |
| 3,336,476 | 8/1967 | Richardson | 250—71.5 |

RALPH G. NILSON, *Primary Examiner.*

S. ELBAUM, *Assistant Examiner.*

UNITED STATES PATENT OFFICE
CERTIFICATE OF CORRECTION

Patent No. 3,398,280 August 20, 1968

Homer A. Moulthrop

It is certified that error appears in the above identified patent and that said Letters Patent are hereby corrected as shown below:

Column 3, lines 4 to 6, beginning with "This difference" cancel all to and including "of the fuel." and insert -- This difference in counts is then indicative of the cooling age of the fuel, since the cooling age is linearly proportional to the difference in the logarithms of the counts of the two isot decays. --; line 31,"this" should read -- the --; same line 31, after "difference insert -- of the logarithms of the counts --; line 56, "This" should read -- The logarithm of this --; lines 65 and 66, ", representing the ratio of could rates," should read -- represents the ratio of count rates, the logarithm of which --. Column 4, line 66, after "signal" insert -- the logarithm of --; li 75, after "whereby" insert -- the logarithm of --. Column 5, line 28, after to semicolon insert -- the logarithms of --. Column 6, line 14, after "difference insert -- of the logarithms --.

Signed and sealed this 17th day of March 1970.

(SEAL)
Attest:

EDWARD M.FLETCHER,JR.  WILLIAM E. SCHUYLER, JR
Attesting Officer  Commissioner of Patents